United States Patent
Takahashi et al.

(10) Patent No.: US 11,066,961 B2
(45) Date of Patent: Jul. 20, 2021

(54) EXHAUST HEAT RECOVERY SYSTEM

(71) Applicant: Kobe Steel, Ltd., Kobe (JP)

(72) Inventors: Kazuo Takahashi, Kobe (JP); Shigeto Adachi, Takasago (JP); Yutaka Narukawa, Takasago (JP); Kazumasa Nishimura, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 273 days.

(21) Appl. No.: 16/099,386

(22) PCT Filed: Apr. 18, 2017

(86) PCT No.: PCT/JP2017/015520
§ 371 (c)(1),
(2) Date: Nov. 6, 2018

(87) PCT Pub. No.: WO2017/195536
PCT Pub. Date: Nov. 16, 2017

(65) Prior Publication Data
US 2019/0211713 A1   Jul. 11, 2019

(30) Foreign Application Priority Data
May 10, 2016 (JP) .............................. JP2016-094280

(51) Int. Cl.
*F01K 19/10* (2006.01)
*F01K 23/10* (2006.01)
(Continued)

(52) U.S. Cl.
CPC ................. *F01K 19/10* (2013.01); *F01K 9/04* (2013.01); *F01K 19/04* (2013.01); *F01K 23/10* (2013.01);
(Continued)

(58) Field of Classification Search
CPC .......... F01K 19/10; F01K 19/04; F01K 23/18; F01K 23/10; F01K 23/101; F01K 9/04;
(Continued)

(56) References Cited

U.S. PATENT DOCUMENTS 3,100,967 A * 8/1963 Brunner .................... F01K 9/04
60/658
2005/0132742 A1 * 6/2005 Sienel ..................... F25B 9/008
62/503
(Continued)

FOREIGN PATENT DOCUMENTS

| CN | 102418622 A | 4/2012 |
| JP | 2015-200182 A | 11/2015 |

OTHER PUBLICATIONS

International Search Report dated Jul. 18, 2017 in PCT/JP2017/015520 filed Apr. 18, 2017.

*Primary Examiner* — Steven S Anderson, II
(74) *Attorney, Agent, or Firm* — Oblon, McClelland, Maier & Neustadt, L.L.P.

(57) ABSTRACT

An exhaust heat recovery system includes an evaporator, an expander, a condenser, a pump, a circulation flow path, a cooling medium pipe, a bypass pipe, a first valve, a second valve for switching between a state in which the working medium can flow into the coolie medium piping and a state in which the working medium cannot flow therein, and a controller for performing the switching control of the valves. When a condition under which the temperature of the working medium flowing into the condenser becomes higher than or equal to a predetermined temperature is satisfied, the controller controls the second valve to switch to the state in which the working medium can flow into the cooling medium pipe.

6 Claims, 6 Drawing Sheets

(51) Int. Cl.
  *F02B 61/04* (2006.01)
  *F01K 19/04* (2006.01)
  *F01K 23/18* (2006.01)
  *F01K 9/04* (2006.01)
  *F02G 5/00* (2006.01)

(52) U.S. Cl.
  CPC ............ *F01K 23/101* (2013.01); *F01K 23/18* (2013.01); *F02B 61/04* (2013.01); *F02G 5/00* (2013.01); *Y02P 80/15* (2015.11); *Y02T 10/12* (2013.01)

(58) Field of Classification Search
  CPC .......... F22G 5/12; Y02P 80/15; Y02P 80/152; F02B 61/04; F02G 5/00
  See application file for complete search history.

(56) References Cited

U.S. PATENT DOCUMENTS

| | | | |
|---|---|---|---|
| 2010/0077777 A1* | 4/2010 | Lifson ..................... | F25B 9/008 62/117 |
| 2012/0073294 A1* | 3/2012 | Enokijima .............. | F01K 25/08 60/660 |
| 2012/0312021 A1* | 12/2012 | Tsuboi ................... | F01K 13/02 60/667 |
| 2015/0285103 A1 | 10/2015 | Tanaka et al. | |
| 2015/0330256 A1* | 11/2015 | Adachi ................... | F01K 13/02 60/646 |

\* cited by examiner

EXHAUST HEAT RECOVERY SYSTEM

TECHNICAL FIELD

The present invention relates to an exhaust heat recovery system.

BACKGROUND ART

Hitherto, various exhaust heat recovery systems that recover exhaust heat generated from an engine or the like have been proposed.

The exhaust heat recovery system described in Patent document 1 includes an evaporator that exchanges heat between a heating medium and a working medium to evaporate the working medium, an expander that expands the working medium evaporated in the evaporator to obtain rotational energy, a power recovery machine such as a generator that converts the rotational energy to other types of energy to recover power, and a condenser that condenses the working medium flowed out of the expander. The working medium can circulate between the evaporator, the expander, and the condenser through a circulation flow path.

Further, this exhaust heat recovery system further includes a bypass pipe that connects the evaporator and the condenser by bypassing the expander, an on-off valve that opens and closes the bypass pipe, and a closing valve that opens and closes an inlet side of the expander.

In a case of emergency stop or the like of the exhaust heat recovery system, the closing valve on the inlet side of the expander is closed and the on-off valve of the bypass pipe is opened. This operation can prevent the high temperature working medium coming out of the evaporator from flowing into the expander and allow the high temperature working medium to detour to a downstream side of the expander via the bypass pipe.

However, in the exhaust heat recovery system described above, when the on-off valve of the bypass pipe is opened, the high temperature working medium detoured to the downstream side of the expander via the bypass pipe flows in the condenser. This may cause deterioration or damage to the condenser by heat of the working medium.

CITATION LIST

Patent Document

Patent Document 1: JP 2015-200182 A

SUMMARY OF THE INVENTION

An object of the present invention is to provide an exhaust heat recovery system capable of preventing deterioration or damage of a condenser caused by heat of a working medium.

An exhaust heat recovery system according to one aspect of the present invention includes an evaporator, an expander, a condenser, a pressure feeding portion, a circulation flow path that circulates a working medium between the evaporator, the expander, the condenser, and the pressure feeding portion, a cooling medium pipe that is connected to the circulation flow path and allows a portion of the working medium sent out from the pressure feeding portion to flow in the condenser, a switching portion that switches between a state in which the working medium is allowed to flow in the cooling medium pipe and a state in which the working medium is not allowed to flow therein, and a control portion that performs a switching control of the switching portion. When a condition under which a temperature of the working medium flowing in the condenser becomes higher than or equal to a predetermined temperature is satisfied, the control portion controls the switching portion to switch to the state in which the working medium is allowed to flow in the cooling medium pipe.

DESCRIPTION OF EMBODIMENTS

Hereinafter, embodiments of an exhaust heat recovery system of the present invention will be described further in detail with reference to the drawings.

Figure 1:
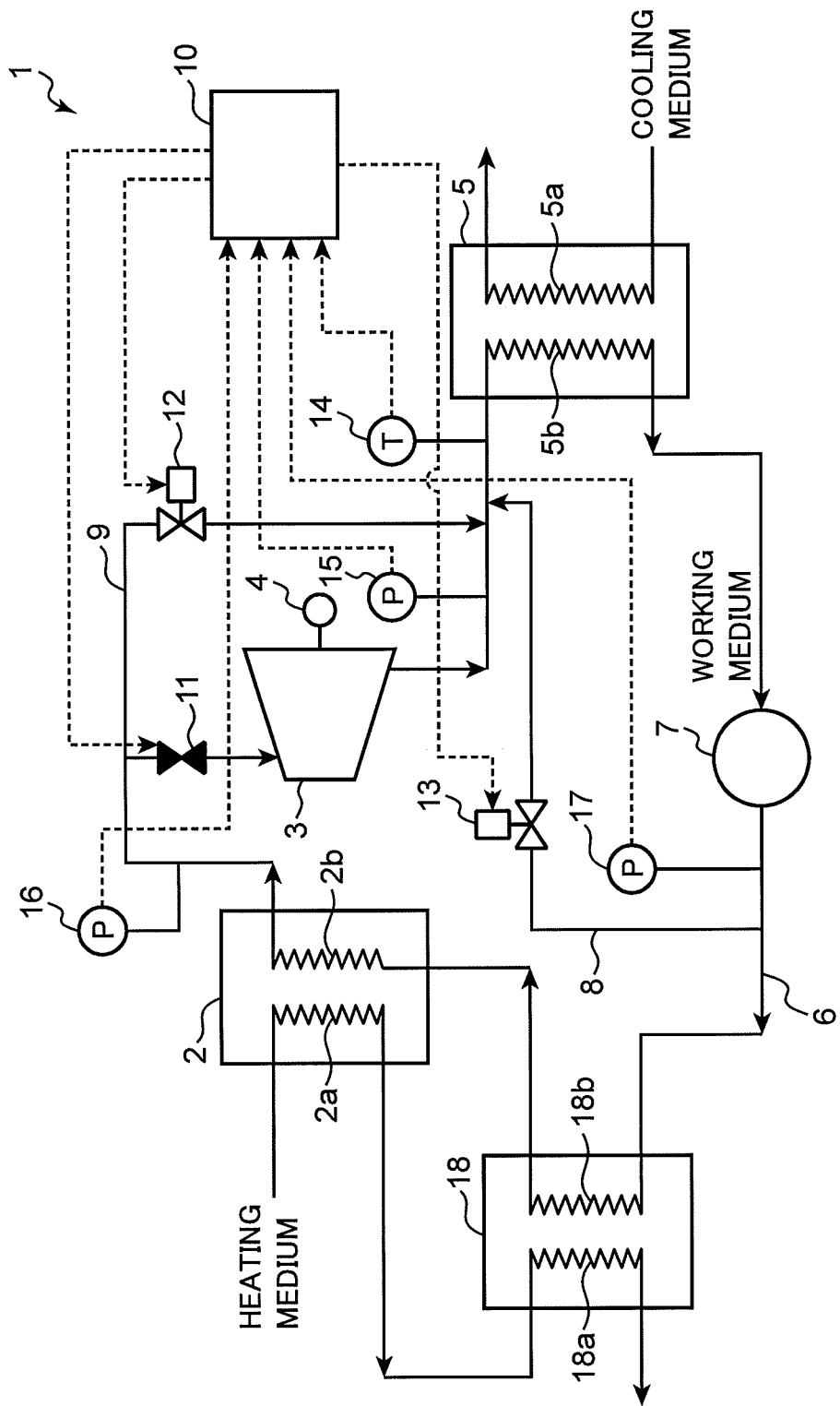
FIG. 1 is a schematic view illustrating a configuration of an exhaust heat recovery system according to an embodiment of the present invention.

As shown in FIG. 1, an exhaust heat recovery system 1 according to the present embodiment includes an evaporator 2, an expander 3, a power recovery machine 4, a condenser 5, a circulation pump 7, a preheater 18, and a circulation flow path 6. In the circulation flow path 6, the evaporator 2, the expander 3, the condenser 5, the circulation pump 7, and the preheater 18 are serially connected in this order. A working medium circulates in the circulation flow path 6.

This exhaust heat recovery system 1 further includes a cooling medium pipe 8 that communicates between an outlet side of the circulation pump 7 and an inlet side of the condenser 5 and a bypass pipe 9 that communicates between the evaporator 2 and the condenser 5 by bypassing the expander 3 as pipes connected to the circulation flow path 6 described above. One end portion of the cooling medium pipe 8 is connected between the circulation pump 7 and the preheater 18 in the circulation flow path 6 and the other end portion is connected between the expander 3 and the condenser 5 in the circulation flow path 6. One end portion of the bypass pipe 9 is connected between the evaporator 2 and the expander 3 in the circulation flow path 6 and the other end portion is connected between the expander 3 and the condenser 5 in the circulation flow path 6. Note that the preheater 18 may be omitted and, in this case, one end portion of the cooling medium pipe 8 is connected between the circulation pump 7 and the evaporator 2 in the circulation flow path 6.

The exhaust heat recovery system 1 further includes an on-off valve 11 arranged on an inlet side of the expander 3 in the circulation flow path 6, a bypass side on-off valve 12 arranged in the bypass pipe 9, and a cooling side on-off valve 13 arranged in the cooling medium pipe 8 as valves that control a flow of the working medium.

Further, the exhaust heat recovery system 1 includes a temperature detection portion (a temperature detection sensor) 14 that detects a temperature of the working medium flowing in the condenser 5, a first pressure detection portion (a first pressure detection sensor) 15 that detects a pressure of the working medium on an outlet side of the expander 3, a second pressure detection portion (a second pressure detection sensor) 16 that detects a pressure of the working medium on an outlet side of the evaporator 2, and a third pressure detection portion (a third pressure detection sensor) 17 that detects a pressure of the working medium on the outlet side of the circulation pump 7 as devices that detect the temperature and pressure of the working medium.

Further, the exhaust heat recovery system 1 includes a control portion 10 capable of performing an on-off control of the on-off valve 11, the bypass side on-off valve 12, and the cooling side on-off valve 13 described above.

Next, each constituent element of the exhaust heat recovery system 1 described above will be described further in detail.

The evaporator 2 heats and evaporates (gasifies) the working medium by performing heat exchange between a heating medium such as high-temperature steam and the liquid working medium. Specifically, the evaporator 2 includes a first flow path 2a in which the high-temperature heating medium such as steam and warm water flows and a second flow path 2b in which the working medium flows.

In the present embodiment, the preheater 18 is arranged between the circulation pump 7 and the evaporator 2. The preheater 18, which has a configuration similar to that of the evaporator 2, includes a first flow path 18a in which the high-temperature heating medium coming out of the first flow path 2a of the evaporator 2 flows and a second flow path 18b in which the working medium on an upstream side of the evaporator 2 flows. The preheater 18 performs heat exchange between the working medium on the upstream side of the evaporator 2 and the high-temperature heating medium, thereby making it possible to preheat the working medium to be introduced in the evaporator 2. Note that a super heater that further overheats the working medium evaporated in the evaporator 2 may be arranged on a downstream side of the evaporator 2.

The expander 3 is arranged at a portion on the downstream side of the evaporator 2 in the circulation flow path 6. In the present embodiment, as the expander 3, for example, a positive displacement screw expander that includes a rotor rotationally driven by expansion energy of the gaseous working medium coming out of the evaporator 2, or the like may be used. In the expander 3, the gaseous working medium is supplied from an inlet port formed in a casing not illustrated to a rotor chamber and the introduced gaseous working medium is expanded in the rotor chamber. The rotor is rotationally driven by the expansion energy generated in this process. Then, the working medium that undergoes a reduction in pressure by the expansion in the rotor chamber is discharged from an outlet port formed in the casing described above to the circulation flow path 6. Note that the expander 3 is not limited to the positive displacement screw expander and a centrifugal expander, a scroll-type expander, or the like may be used.

The power recovery machine 4 is connected to a rotating shaft of the expander 3. In the present embodiment, a generator is used as the power recovery machine 4. This power recovery machine 4 includes a rotating shaft connected to the rotor of the expander 3. The power recovery machine 4 generates power by rotation of the rotating shaft described above that is caused by rotation of the rotor. Note that, as the power recovery machine 4, a compressor or the like may be used other than the generator.

The condenser 5 is arranged at a portion on a downstream side of the expander 3 in the circulation flow path 6. The condenser 5 condenses (liquefies) the working medium by cooling the gaseous working medium expanded in the expander 3 by a cooling medium. Specifically, the condenser 5 includes a first flow path 5a in which the cooling medium such as water flows and a second flow path 5b in which the working medium flowed out of the expander 3 flows. As the condenser 5, for example, a brazed plate type heat exchanger or the like is used. The brazed plate type heat exchanger has a structure of alternately layering a first plate on whose surface a groove is formed to function as a flow path of the working medium and a second plate on whose surface a groove is formed to function as a flow path of the cooling medium. A stacked body of the first plate and the second plate forms the flow path of the working medium and the flow path of the cooling medium. A pipe connected to pipes constituting the circulation flow path 6 is brazed to the stacked body so as to communicate with a flow path of the working medium. Further, a pipe connected to pipes constituting a cooling medium circuit is brazed to the stacked body so as to communicate with a flow path of the cooling medium.

The circulation pump 7 is arranged at a portion on a downstream side of the condenser 5 (i.e., a portion between the condenser 5 and the preheater 18) in the circulation flow path 6. The circulation pump 7 pressurizes the liquid working medium condensed in the condenser 5 to a predetermined pressure and sends it under pressure to the preheater 18 on a downstream side of the circulation pump 7 in the circulation flow path 6.

Figure 2:
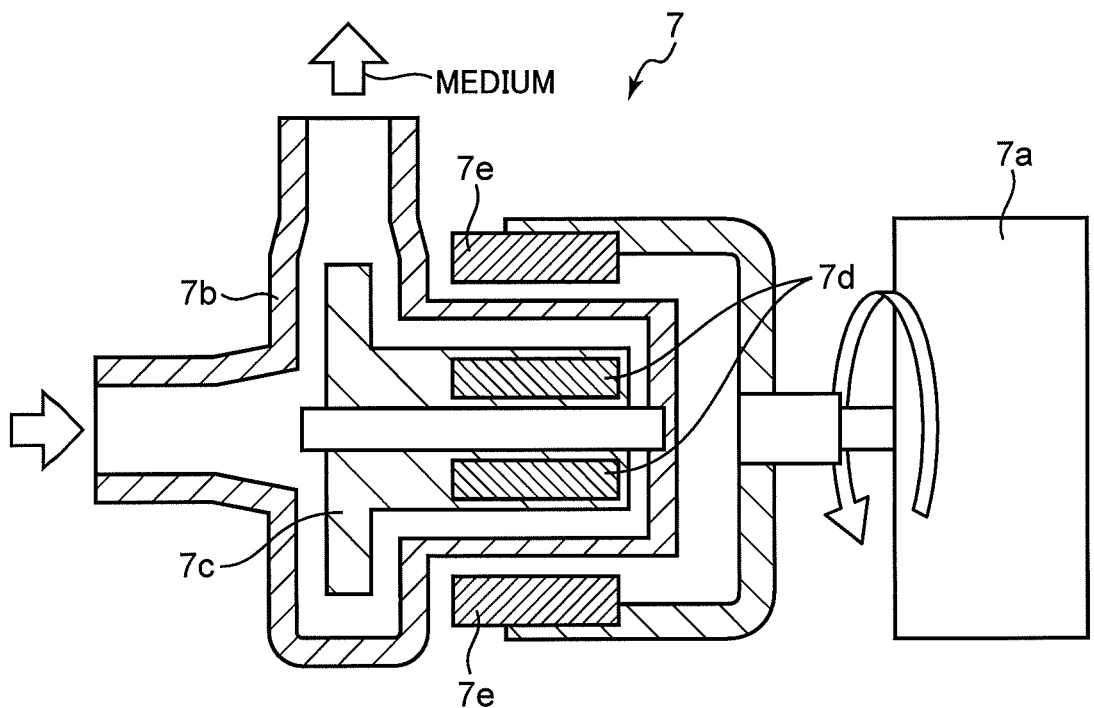
FIG. 2 is a sectional view illustrating a configuration of a pump included in the exhaust heat recovery system shown in FIG. 1.

In the present embodiment, as the circulation pump 7, for example, a magnetic drive pump is used. Specifically, as shown in FIG. 2, the circulation pump 7 includes a motor 7a, a casing 7b, an impeller 7c freely rotatably stored inside the casing 7b, a driven side permanent magnet 7d incorporated in the impeller 7c, and a driving side permanent magnet 7e connected to a rotating shaft of the motor 7a via a bracket. The driving side permanent magnet 7e is rotated around the rotating shaft of the motor 7a by driving force of the motor 7a, allowing the impeller 7c inside the casing 7b to rotate by force by which the driven side permanent magnet 7d incorporated in the impeller 7c is pulled toward the driving side permanent magnet 7e. The working medium is introduced in the casing 7b by the rotation of the impeller 7c. Having this configuration eliminates a portion connecting the motor 7a and the impeller 7c through the casing 7b, thereby improving sealing performance of the casing 7b and reducing a risk of leakage of the working medium. Note that the circulation pump 7 is not limited to the configuration described above and other configurations may be used. For example, the circulation pump 7 may be a gear pump in which a rotor is constituted by a pair of gears, or the like.

The cooling medium pipe 8 is connected to the circulation flow path 6 to communicate between the outlet side of the circulation pump 7 and the inlet side of the condenser 5. The cooling medium pipe 8 allows a portion of the liquid working medium sent out from the circulation pump 7 to flow in the condenser 5 without passing through the evaporator 2.

The bypass pipe 9 connects the outlet side of the evaporator 2 and the inlet side of the condenser 5 in the circulation flow path 6, thereby communicating between the evaporator 2 and the condenser 5 by bypassing the expander 3 in the circulation flow path 6.

The on-off valve 11 is arranged between a connection portion of the bypass pipe 9 and the expander 3 in the circulation flow path 6. That is, the on-off valve 11 is arranged on the inlet side of the expander 3 in the circulation flow path 6. The on-off valve 11 is constituted by a closing valve that switches between an open state and a closed state. Note that the on-off valve 11 may be a flow rate adjusting valve capable of freely adjusting a flow rate of the working medium flowing in the expander 3.

The bypass side on-off valve 12 is arranged on the way of the bypass pipe 9 and functions as a bypass side on-off portion that opens and closes the bypass pipe 9. The bypass side on-off valve 12 is a closing valve that switches between an open state and a closed state. The bypass side on-off valve 12 is controlled by a control portion 10 to be opened at the time of, for example, stop operation (both ordinary stop and emergency stop) and start operation of the exhaust heat recovery system 1. This operation allows the detour to the downstream side of the expander 3 via the bypass pipe 9 at the time of stop operation and start operation.

The cooling side on-off valve 13 is arranged in the cooling medium pipe 8. The cooling side on-off valve 13 functions as a switching portion that switches between a state in which the liquid working medium is allowed to flow in the condenser 5 via the cooling medium pipe 8 and a state in which the liquid working medium is not allowed to flow therein. In the present embodiment, the cooling side on-off valve 13 is constituted by a closing valve that switches between an open state and a closed state. Note that the cooling side on-off valve of the present invention is only required to have a configuration capable of switching between the state in which the working medium is allowed to flow in the condenser 5 via the cooling medium pipe 8 and the state in which the working medium is not allowed to flow therein. Thus, the switching portion may be constituted by a three-way valve arranged in a portion where the cooling medium pipe 8 is branched from the circulation flow path 6 instead of using the cooling side on-off valve.

The temperature detection portion 14 is arranged on the inlet side (an upstream side) of the condenser 5. The temperature detection portion 14 can detect a temperature of the working medium flowing in the condenser 5.

The first pressure detection portion 15 is arranged on the outlet side (the downstream side) of the expander 3 and functions as an expander outlet side pressure detection portion that detects a pressure of the working medium flowed out of the expander 3.

The second pressure detection portion 16 is arranged on the outlet side (the downstream side) of the evaporator 2 and functions as an evaporator outlet side pressure detection portion that detects a pressure of the gaseous working medium discharged from the evaporator 2.

The third pressure detection portion 17 is arranged on the downstream side (the outlet side) of the circulation pump 7 and detects a pressure of the working medium discharged from the circulation pump 7. Note that the third pressure detection portion 17 may be omitted.

As described above, the exhaust heat recovery system 1 of the present embodiment includes the cooling medium pipe 8 that is connected to the circulation flow path 6 and allows a portion of the working medium sent out from the circulation pump 7 to flow in the condenser 5, the cooling side on-off valve 13 that can switch between the state in which the working medium is allowed to flow in the cooling medium pipe 8 and the state in which the working medium is not allowed to flow therein, and the control portion 10 that performs a switching control of the cooling side on-off valve 13.

When a condition under which a temperature of the working medium flowing in the condenser 5 becomes higher than or equal to a predetermined temperature is satisfied, the control portion 10 controls the cooling side on-off valve 13 to the state in which the working medium is allowed to flow in the cooling medium pipe 8. That is, the control portion 10 performs a control for opening the cooling side on-off valve 13. With this operation, the low temperature working medium before being heated by the evaporator 2 in the circulation flow path 6 passes through the cooling medium pipe 8 and then merges with the high temperature working medium coming out of the evaporator 2. As a result, the high temperature working medium can be cooled by the liquid working medium, thus making it possible to reduce a risk of deterioration or damage of the condenser 5 by heat of the working medium. In particular, in a case of the present embodiment where the condenser 5 has a structure of a brazed plate type condenser in which a plurality of plates are brazed to pipes, a risk of deterioration or damage of a brazed portion by heat can be reduced.

Figure 3:
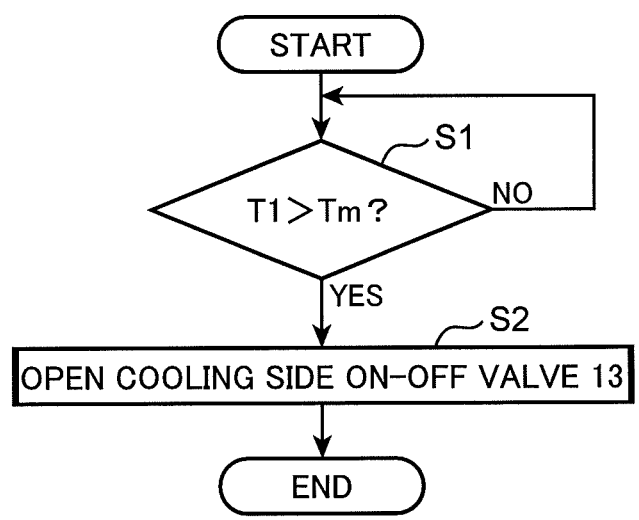
FIG. 3 is a flowchart showing an example of a control for opening a cooling side on-off portion by a control portion included in the exhaust heat recovery system shown in FIG. 1.

A specific control example of the cooling side on-off valve 13 is shown in a flowchart in FIG. 3. In this control, the control portion 10 compares a detection temperature T1 obtained by the temperature detection portion 14 with a preset temperature (a threshold value) Tm. As a result, if the temperature T1 of the working medium is detected to be higher than or equal to the predetermined temperature Tm (Yes in Step S1), the control portion 10 performs a control for opening the cooling side on-off valve 13 on the basis of the temperature T1 of the working medium detected by the temperature detection portion 14 being higher than or equal to the predetermined temperature Tm (Step S2). That is, the cooling side on-off valve 13 is switched to the state in which the working medium is allowed to flow in the cooling medium pipe 8. Note that if the temperature T1 of the working medium becomes lower than the predetermined temperature Tm after Step S2, the control portion 10 only needs to perform a control for closing the cooling side on-off valve 13.

In the control of the cooling side on-off valve 13 in the flowchart in FIG. 3, the temperature of the working medium is detected by the temperature detection portion 14 before the working medium heated by the evaporator 2 reaches an inlet of the condenser 5. If the detected temperature is higher than or equal to the predetermined temperature, the control portion 10 controls the cooling side on-off valve 13 to switch to the state in which the working medium is allowed to flow in the cooling medium pipe 8. That is, the control portion 10 performs a control for opening the cooling side on-off valve 13. With this operation, the low temperature working medium before being heated by the evaporator 2 passes through the cooling medium pipe 8 and merges with the high temperature working medium coming out of the evaporator 2 to cool the high temperature working medium. This makes it possible to reduce a risk of deterioration or damage of the condenser 5 by heat of the working medium.

In particular, even if the high temperature working medium coming out of the evaporator 2 reaches the upstream side of the condenser 5 via the bypass pipe 9 for bypassing the expander 3 with the high temperature, the high temperature working medium is cooled by the low temperature working medium to be flowed in the condenser 5 via the cooling medium pipe 8. Thus, in the configuration in which the exhaust heat recovery system 1 includes the bypass pipe 9 as shown in FIG. 1, it is also possible to surely reduce a risk of deterioration or damage of the condenser 5 by heat of the working medium.

Here, the condition under which the temperature of the working medium flowing in the condenser 5 becomes higher than or equal to the predetermined temperature is presumed to be satisfied, for example, in the following cases.

(1) A case where the bypass side on-off valve 12 is opened.

(2) A case where the bypass side on-off valve 12 is opened and the temperature detected by the temperature detection portion 14 is higher than or equal to the predetermined temperature.

(3) A case where the operation of the exhaust heat recovery system 1 is stopped.

(4) A case where the pressure of the working medium on the outlet side of the evaporator 2 detected by the second pressure detection portion 16 is higher than or equal to a predetermined pressure.

(5) A case where the pressure of the working medium on the outlet side of the expander 3 detected by the first pressure detection portion 15 is higher than or equal to a predetermined pressure.

Thus, in another embodiment of the present invention, a control for opening the cooling side on-off valve 13 is performed in each of the above cases (1) to (5). The control in each of the above cases (1) to (5) will be described below in this order.

(1) A control for opening the cooling side on-off valve 13 in the case where the bypass side on-off valve 12 is opened.

The control portion 10 opens the bypass side on-off valve 12 at the time of, for example, start operation, stop operation, or emergency stop of the exhaust heat recovery system 1. This leads to an operation (a so-called bypass operation) that allows a flow via the bypass pipe 9 for bypassing the expander 3. In this case, there is a high possibility that the working medium heated to a high temperature in the evaporator 2 flows in the condenser 5 via the bypass pipe 9 with the high temperature. Thus, in the above configuration in which the exhaust heat recovery system 1 includes the bypass pipe 9 and the bypass side on-off valve 12, the control portion 10 controls the cooling side on-off valve 13 to switch to the state in which the working medium is allowed to flow in the cooling medium pipe 8 regardless of the detection temperature by the temperature detection portion 14 when the bypass side on-off valve 12 is opened.

Figure 4:
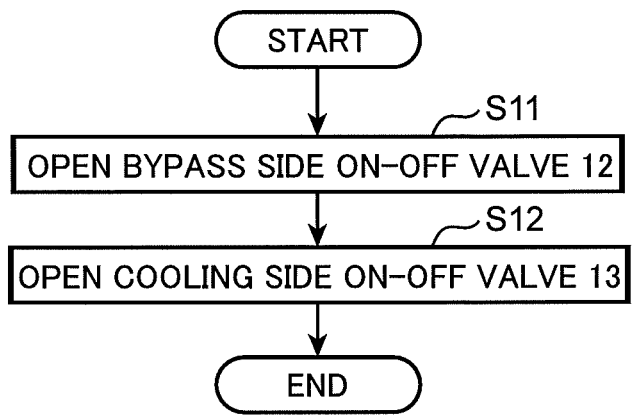
FIG. 4 is a flowchart showing another example of a control for opening the cooling side on-off portion by the control portion included in the exhaust heat recovery system shown in FIG. 1.

Specifically, as shown in a flowchart in FIG. 4, the control portion 10 first performs a control for opening the bypass side on-off valve 12 (Step S11) and then performs a control for opening the cooling side on-off valve 13 (Step S12). As for a timing for opening the bypass side on-off valve 12 and a timing for opening the cooling side on-off valve 13, these valves may be opened simultaneously or one of these valves may be opened first.

In the above control, the control portion 10 controls the cooling side on-off valve 13 to switch to the state in which the working medium is allowed to flow in the cooling medium pipe 8 regardless of the temperature of the working medium when the bypass side on-off valve 12 is opened. With this operation, the low temperature working medium before being heated in the evaporator 2 merges with the high temperature working medium flowed from the bypass pipe 9 before the low temperature working medium is introduced in the condenser 5 via the cooling medium pipe 8. Thus, the high temperature working medium is cooled before flowing in the condenser 5, making it possible to surely reduce a risk of deterioration or damage of the condenser 5 by heat of the working medium. This allows the configuration without the temperature detection portion 14.

(2) A control for opening the cooling side on-off valve 13 in the case where the bypass side on-off valve 12 is opened and the detected temperature is higher than or equal to the predetermined temperature.

As a modification of the control example in FIG. 4, the control portion 10 may control the cooling side on-off valve 13 to switch to the state in which the working medium is allowed to flow in the cooling medium pipe 8 when the bypass side on-off valve 12 is opened and the detection temperature by the temperature detection portion 14 is higher than or equal to the predetermined temperature.

Figure 5:
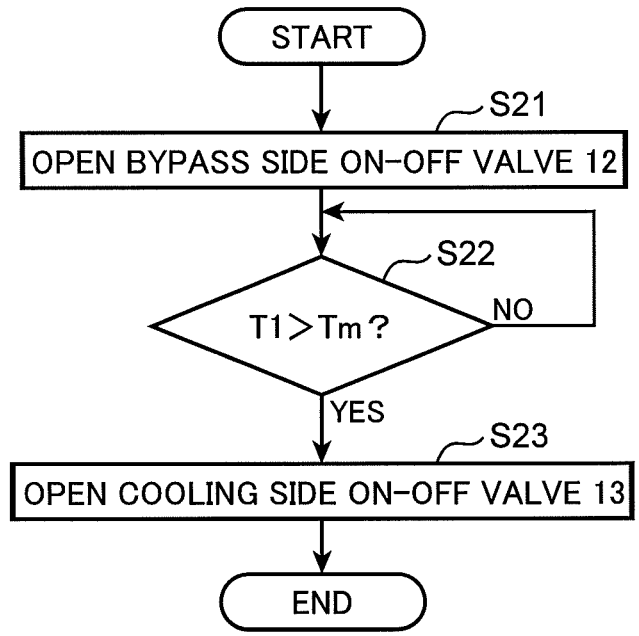
FIG. 5 is a flowchart showing still another example of a control for opening the cooling side on-off portion by the control portion included in the exhaust heat recovery system shown in FIG. 1.

Specifically, as shown in a flowchart in FIG. 5, the control portion 10 first performs a control for opening the bypass side on-off valve 12 (Step S21). If the temperature T1 of the working medium detected by the temperature detection portion 14 is higher than or equal to the predetermined temperature Tm (YES in Step S22), the control portion 10 performs a control for opening the cooling side on-off valve 13 (Step S23).

That is, during the bypass operation in which the bypass side on-off valve 12 is opened and the working medium heated in the evaporator 2 flows in the condenser 5 by bypassing the expander 3, the control portion 10 controls the cooling side on-off valve 13 to switch to the state in which the working medium is allowed to flow in the cooling medium pipe 8 when the temperature of the working medium on the inlet side of the condenser 5 becomes higher than or equal to the predetermined temperature. With this operation, if the temperature of the working medium before flowing in the condenser 5 via the bypass pipe 9 is high, the high temperature working medium is cooled by the low temperature working medium flowed out of the cooling medium pipe 8. As a result, it becomes possible to surely reduce a risk of deterioration or damage of the condenser 5 by heat of the working medium during the bypass operation.

Moreover, if the temperature of the working medium to be introduced in the condenser 5 via the bypass pipe 9 is lower than the predetermined temperature, the low temperature working medium is not introduced in the condenser 5 via the cooling medium pipe 8, thus making it possible to prevent a reduction in operation efficiency.

(3) A control for opening the cooling side on-off valve 13 in the case where the operation of the exhaust heat recovery system 1 is stopped.

When the operation of the exhaust heat recovery system 1 is stopped by stopping driving of the circulation pump 7 at the time of emergency stop or the like, it happens such that the working medium heated to a high temperature in the evaporator 2 flows in the condenser 5 via the bypass pipe 9 with the high temperature. In this case, there is a risk that the temperature of the working medium flowing in the condenser 5 becomes higher than or equal to the predetermined temperature. Thus, the control portion 10 controls the cooling side on-off valve 13 to switch to the state in which the working medium is allowed to flow in the cooling medium pipe 8 when the operation of the exhaust heat recovery system 1 is stopped.

Figure 6:
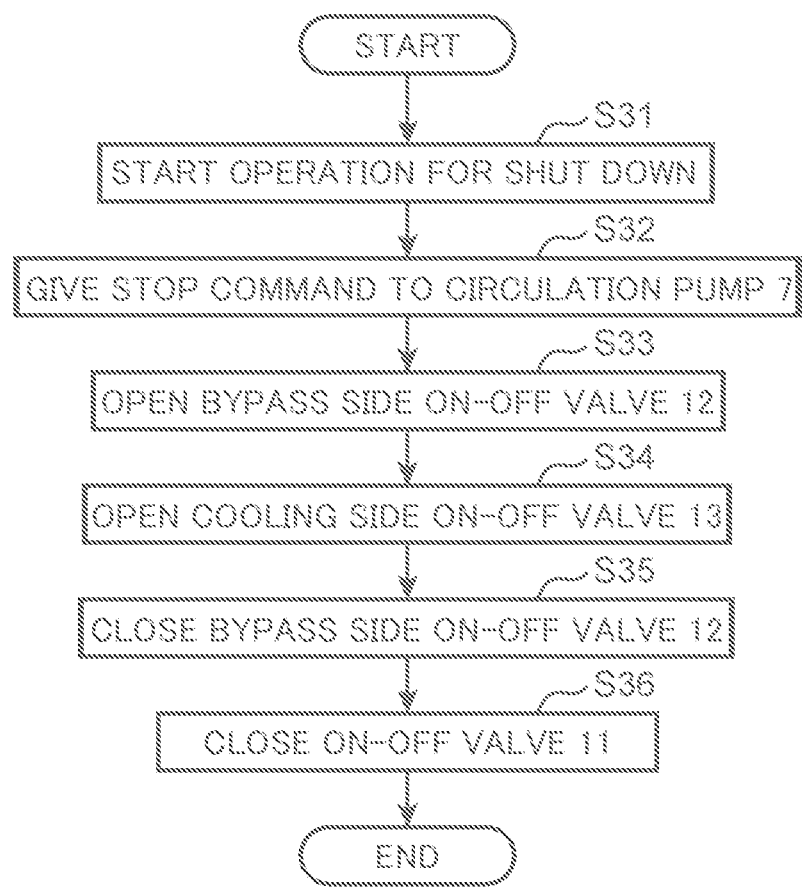
FIG. 6 is a flowchart showing still another example of a control for opening the cooling side on-off portion by the control portion included in the exhaust heat recovery system shown in FIG. 1.

Specifically, as shown in a flowchart in FIG. 6, when the control portion 10 starts an operation for stop operation on the basis of, for example, the reception of an operation stop signal (Step S31), the control portion 10 gives a stop command to the circulation pump 7 (Step S32) and performs a control for opening the bypass side on-off valve 12 (Step S33). This initiates the bypass operation in which the working medium passes through the bypass pipe 9. While the driving of the circulation pump 7 is gradually stopped upon the reception of the stop command, the control portion 10 performs a control for opening the cooling side on-off valve 13 (Step S34). With this operation, the cooling side on-off valve 13 is switched to the state in which the liquid working medium discharged from the circulation pump 7 is allowed to flow in the cooling medium pipe 8. Then, when a preset fixed time elapses after the opening of the cooling side on-off valve 13, the control portion 10 first performs a control for closing the bypass side on-off valve 12 (Step S35) and then performs a control for closing the on-off valve 11 (Step S36). This completes a series of operations for stop operation.

Note that the operation of closing the on-off valve 11 in Step S36 may be performed before the operation of closing the bypass side on-off valve 12 in Step S35. Alternatively, the on-off valve 11 and the bypass side on-off valve 12 may be closed simultaneously. The on-off valve 11 may be configured to be gradually closed.

In this control, the working medium to be introduced in the condenser 5 after flowing through the expander 3 or the bypass pipe 9 is cooled by the low temperature working medium to be flowed in the condenser 5 via the cooling medium pipe 8 when the operation of the exhaust heat recovery system 1 is stopped. As a result, it becomes possible to surely reduce a risk of deterioration or damage of the condenser 5 by heat of the working medium when the operation of the exhaust heat recovery system 1 is stopped.

(4) A control for opening the cooling side on-off valve 13 in the case where the pressure of the working medium on the outlet side of the evaporator 2 is higher than or equal to the predetermined pressure.

When the temperature of the working medium evaporated by heating in the evaporator 2 is increased to the predetermined temperature or higher, the pressure of the working medium is also increased to the predetermined pressure or higher. Thus, in this control, the control portion 10 controls the cooling side on-off valve 13 to switch to the state in which the working medium is allowed to flow in the cooling medium pipe 8 on the basis of detection of the pressure of the working medium on the outlet side of the evaporator 2 by the second pressure detection portion 16 (an evaporator outlet side pressure detection portion) instead of the detection of the temperature of the working medium.

Figure 7:
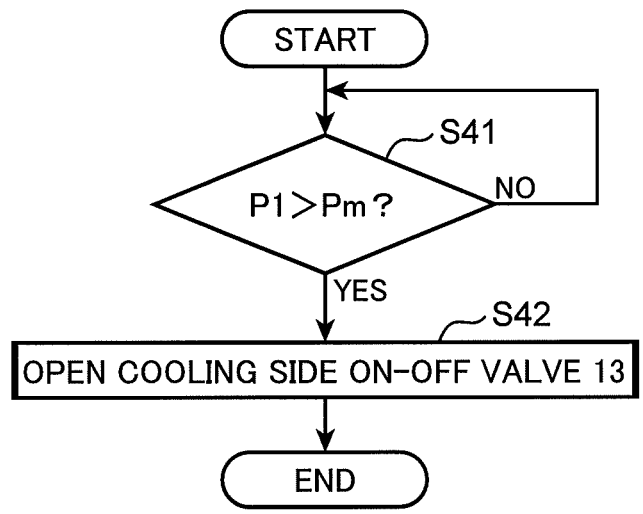
FIG. 7 is a flowchart showing still another example of a control for opening the cooling side on-off portion by the control portion included in the exhaust heat recovery system shown in FIG. 1.

Specifically, the control portion 10 first compares a detection pressure P1 obtained by the second pressure detection portion 16 with a preset pressure Pm. Then, as shown in a flowchart in FIG. 7, if the pressure P1 of the working medium detected by the second pressure detection portion 16 is higher than or equal to the predetermined pressure Pm (Yes in Step S41), the control portion 10 performs a control for opening the cooling side on-off valve 13 on the basis of the pressure P1 of the working medium detected by the second pressure detection portion 16 being higher than or equal to the predetermined pressure Pm (Step S42). With this operation, the low temperature working medium before being heated by the evaporator 2 flows in the condenser 5 via the cooling medium pipe 8. As a result, the high temperature working medium coming out of the evaporator 2 is cooled by the low temperature working medium, thus making it possible to reduce a risk of deterioration or damage of the condenser 5 by heat of the working medium.

(5) A control for opening the cooling side on-off valve 13 in the case where the pressure of the working medium on the outlet side of the expander 3 is higher than or equal to the predetermined pressure.

The temperature of the working medium on the outlet side of the expander 3 is increased to the predetermined temperature or higher, for example, when the high temperature working medium heated by the evaporator 2 passes through the bypass pipe 9 at the time of stop operation or the like. In such a case, the pressure of the working medium on the outlet side of the expander 3 is also increased to the predetermined pressure or higher. Thus, in this control, the control portion 10 controls the cooling side on-off valve 13 to switch to the state in which the working medium is allowed to flow in the cooling medium pipe 8 on the basis of detection of the pressure of the working medium on the outlet side of the expander 3 by the first pressure detection portion 15 (an expander outlet side pressure detection portion) instead of the detection of the temperature of the working medium.

Figure 8:
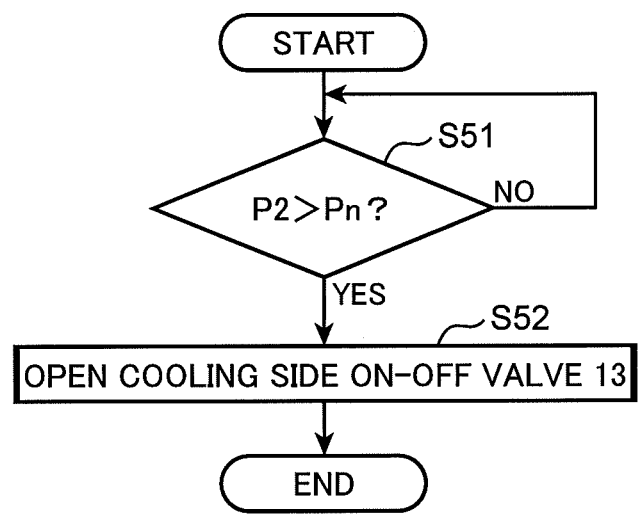
FIG. 8 is a flowchart showing still another example of a control for opening the cooling side on-off portion by the control portion included in the exhaust heat recovery system shown in FIG. 1.

Specifically, the control portion 10 first compares a detection pressure P2 obtained by the first pressure detection portion 15 with a preset pressure Pn. Then, as shown in a flowchart in FIG. 8, if the pressure P2 of the working medium detected by the first pressure detection portion 15 is higher than or equal to the predetermined pressure Pn (Yes in Step S51), the control portion 10 performs a control for opening the cooling side on-off valve 13 on the basis of the pressure P2 of the working medium detected by the first pressure detection portion 15 being higher than or equal to the predetermined pressure Pn (Step S52). With this operation, the low temperature working medium before being heated by the evaporator 2 flows in the condenser 5 via the cooling medium pipe 8. As a result, the high temperature working medium coming out of the evaporator 2 is cooled by the low temperature working medium, thus making it possible to reduce a risk of deterioration or damage of the condenser 5 by heat of the working medium.

Note that, in a case where an emergency shut-off valve that performs a shut-off operation at the inlet of the expander 3 at the time of emergency stop, the pressure cannot be detected on the outlet side of the expander 3 at the time of emergency stop. Thus, in such a case, the control portion 10 preferably performs the control for opening the cooling side on-off valve 13 on the basis of the pressure on the outlet side of the evaporator 2 as shown in the above (3).

Figure 9:
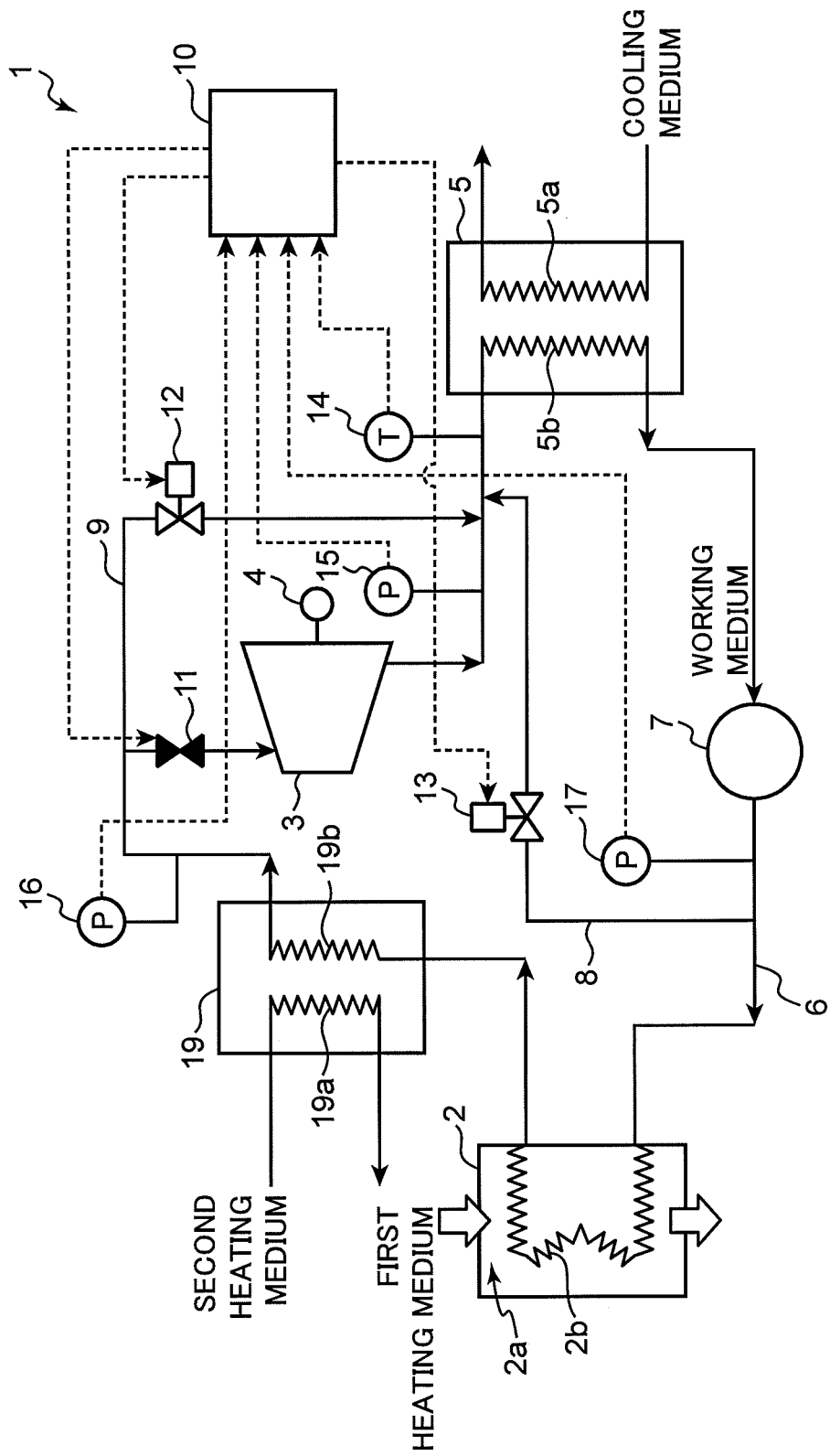
FIG. 9 is a schematic view illustrating a configuration of an exhaust heat recovery system according to another embodiment of the present invention.

In the exhaust heat recovery system 1 of the above embodiment, as shown in FIG. 1, one kind of heating medium (e.g., either steam or warm water) is used as the heating medium that heats the working medium. Then, this one kind of heating medium is supplied to the evaporator 2 and the preheater 18 to heat the working medium. However, the present invention is not limited thereto. For example, the preheater 18 may be omitted. Further, as still another embodiment of the present invention, the working medium may be heated by two kinds of heating media as exemplified in the exhaust heat recovery system 1 shown in FIG. 9. For example, the exhaust heat recovery system 1 shown in FIG. 9 includes the evaporator 2 to which a first heating medium is supplied and a super heater 19 to which a second heating medium different from the first heating medium is supplied. Examples of the first heating medium include gas such as compressed air compressed by an air compressing means (an engine supercharger or the like). Examples of the second heating medium include steam, warm water, and the like. The evaporator 2 only needs to include a first flow path 2a through which the first heating medium such as the compressed air can pass and a second flow path 2b through which the working medium passes, the second flow path 2b being configured to pass through the first flow path 2a. A configuration is not limited to the case where the second flow path 2b passes through the first flow path 2a. Further, the super heater 19 only needs to include a first flow path 19a through which the second heating medium such as steam can pass and a second flow path 19b through which the working medium passes. Further, a preheater that preheats the working medium may be arranged on an upstream side of the evaporator 2. Note that in a case where the preheater is arranged, the super heater 19 may be omitted. In this case, the heating medium supplied to the preheater is different from the heating medium supplied to the evaporator 2.

Summary of Embodiments

Here, a summary of the above embodiments is described.

(1) The exhaust heat recovery system of the above embodiment includes the evaporator, the expander, the condenser, the pressure feeding portion, the circulation flow path that circulates the working medium between the evaporator, the expander, the condenser, and the pressure feeding portion, the cooling medium pipe that is connected to the circulation flow path and allows a portion of the working medium sent out from the pressure feeding portion to flow in the condenser, the switching portion that switches between the state in which the working medium is allowed to flow in the cooling medium pipe and the state in which the working medium is not allowed to flow therein, and the control portion that performs the switching control of the switching portion. When the condition under which the temperature of the working medium flowing in the condenser becomes higher than or equal to the predetermined temperature is satisfied, the control portion controls the switching portion to switch to the state in which the working medium is allowed to flow in the cooling medium pipe.

In such a configuration, when the condition under which the temperature of the working medium flowing in the condenser becomes higher than or equal to the predetermined temperature is satisfied, the control portion controls the switching portion to switch to the state in which the working medium is allowed to flow in the cooling medium pipe. With this operation, the low temperature working medium before being heated by the evaporator in the circulation flow path passes through the cooling medium pipe and merges with the high temperature working medium coming out of the evaporator. As a result, the high temperature working medium is cooled by the low temperature working medium, thus making it possible to reduce a risk of deterioration or damage of the condenser by heat of the working medium.

(2) The exhaust heat recovery system described above may further include the temperature detection portion that detects the temperature of the working medium on the inlet side of the condenser. In this case, the condition described above is preferably satisfied when the temperature of the working medium detected by the temperature detection portion is higher than or equal to the predetermined temperature.

According to such a configuration, the temperature of the working medium is detected by the temperature detection portion before the working medium heated by the evaporator reaches the inlet of the condenser. If the detected temperature is higher than or equal to the predetermined temperature, the control portion controls the switching portion to switch to the state in which the working medium is allowed to flow in the cooling medium pipe. With this operation, the low temperature working medium before being heated by the evaporator passes through the cooling medium pipe and merges with the high temperature working medium coming out of the evaporator to cool the high temperature working medium. This makes it possible to reduce a risk of deterioration or damage of the condenser by heat of the working medium.

(3) The exhaust heat recovery system described above may further include the bypass pipe that communicates between the evaporator and the condenser by bypassing the expander and sends the working medium flowed out of the evaporator to the condenser and the bypass side on-off portion that opens and closes the bypass pipe.

In the above configuration in which the bypass pipe is arranged between the evaporator and the condenser to bypass the expander, if the temperature of the working medium detected by the temperature detection portion is higher than or equal to the predetermined temperature, the control portion controls the switching portion to switch to the state in which the working medium is allowed to flow in the cooling medium pipe. With this operation, even if the high temperature working medium coming out of the evaporator reaches the condenser via the bypass pipe with the high temperature, the high temperature working medium is cooled by the low temperature working medium flowing from the cooling medium pipe. Thus, even in the configuration in which the bypass pipe is included, a risk of deterioration or damage of the condenser by heat of the working medium can be surely reduced.

(4) The exhaust heat recovery system described above may further include the bypass pipe that communicates between the evaporator and the condenser by bypassing the expander and sends the working medium flowed out of the evaporator to the condenser and the bypass side on-off portion that opens and closes the bypass pipe. In this case, the condition described above may be satisfied upon opening of the bypass side on-off portion.

The bypass side on-off portion is opened at the time of, for example, start operation, stop operation, or emergency stop of the exhaust heat recovery system. This leads to the operation (a so-called bypass operation) that allows a flow via the bypass pipe that bypasses the expander. In this case, there is a high possibility that the working medium heated to a high temperature in the evaporator flows in the condenser via the bypass pipe with the high temperature. Thus, in this configuration, the control portion controls the switching portion to switch to the state in which the working medium is allowed to flow in the cooling medium pipe regardless of the temperature of the working medium when the bypass side on-off portion is opened. With this operation, the low temperature working medium before being heated in the evaporator passes through the cooling medium pipe and merges with the working medium flowing from the bypass pipe. This cools the working medium to be introduced in the condenser, thus making it possible to surely reduce a risk of deterioration or damage of the condenser by heat of the working medium.

(5) The exhaust heat recovery system described above may further include the bypass pipe that communicates between the evaporator and the condenser by bypassing the expander and sends the working medium flowed out of the evaporator to the condenser, the bypass side on-off portion that opens and closes the bypass pipe, and the temperature detection portion that detects the temperature of the working medium on the inlet side of the condenser. In this case, the condition described above may be satisfied when the bypass side on-off portion is opened and the temperature of the working medium detected by the temperature detection portion is higher than or equal to the predetermined temperature.

According to such a configuration, during the bypass operation in which the bypass side on-off portion is opened and the working medium heated in the evaporator flows in the condenser via the bypass pipe, the control portion controls the switching portion to switch to the state in which the working medium is allowed to flow in the cooling medium pipe when the temperature of the working medium on the inlet side of the condenser becomes higher than or equal to the predetermined temperature. With this operation, if the temperature of the working medium flowing from the bypass pipe is high, the working medium is cooled by the low temperature working medium before flowing in the condenser via the cooling medium pipe. As a result, it becomes possible to surely reduce a risk of deterioration or damage of the condenser by heat of the working medium during the bypass operation.

(6) The condition described above may be satisfied upon stopping of the operation of the exhaust heat recovery system.

According to such a configuration, when the operation of the exhaust heat recovery system is stopped by stopping the driving of the pressure feeding portion in a case of emergency stop or the like, there is a risk that the temperature of the working medium flowing in the condenser becomes higher than or equal to the predetermined temperature. Thus, the control portion controls the switching portion to switch to the state in which the working medium is allowed to flow in the cooling medium pipe when the operation of the exhaust heat recovery system is stopped. With this operation, the working medium to be introduced in the condenser after being discharged from the expander is cooled by the low temperature working medium flowing from the cooling medium pipe at the time of stop operation. As a result, it becomes possible to surely reduce a risk of deterioration or damage of the condenser by heat of the working medium at the time of stop operation of the exhaust heat recovery system.

(7) The exhaust heat recovery system described above may further include the evaporator outlet side pressure detection portion that detects the pressure of the working medium on the outlet side of the evaporator. In this case, the condition described above may be satisfied when the pressure of the working medium on the outlet side of the evaporator detected by the evaporator outlet side pressure detection portion is higher than or equal to the predetermined pressure.

When the temperature of the working medium heated by the evaporator is increased to the predetermined temperature or higher, the pressure of the working medium is also increased to the predetermined pressure or higher. Thus, in this configuration, the pressure of the working medium on the outlet side of the evaporator is detected by the evaporator outlet side pressure detection portion instead of detecting the temperature of the working medium. If the detected pressure is higher than or equal to the predetermined pressure, the control portion controls the switching portion to switch to the state in which the working medium is allowed to flow in the cooling medium pipe. With this operation, the low temperature working medium before being heated by the evaporator flows in the condenser via the cooling medium pipe. As a result, the high temperature working medium coming out of the evaporator is cooled by the low temperature working medium, thus making it possible to reduce a risk of deterioration or damage of the condenser by heat of the working medium.

(8) The exhaust heat recovery system described above may further include the expander outlet side pressure detection portion that detects the pressure of the working medium on the outlet side of the expander. In this case, the condition described above may be satisfied when the pressure of the working medium on the outlet side of the expander detected by the expander outlet side pressure detection portion is higher than or equal to the predetermined pressure.

When the temperature of the working medium on the outlet side of the expander is increased to the predetermined temperature or higher, the pressure of the working medium is also increased to the predetermined pressure or higher. Thus, in this configuration, the pressure of the working medium on the outlet side of the expander is detected by the expander outlet side pressure detection portion instead of detecting the temperature of the working medium. If the detected pressure is higher than or equal to the predetermined pressure, the control portion controls the switching portion to switch to the state in which the working medium is allowed to flow in the cooling medium pipe. With this operation, the low temperature working medium before being heated by the evaporator flows in the condenser via the cooling medium pipe. As a result, the high temperature working medium coming out of the evaporator is cooled by the low temperature working medium, thus making it possible to reduce a risk of deterioration or damage of the condenser by heat of the working medium.

As described above, according to the exhaust heat recovery system of the present embodiment, it becomes possible to prevent deterioration or damage of the condenser by heat of the working medium.

The invention claimed is:
1. An exhaust heat recovery system comprising:
    an evaporator;
    an expander;
    a condenser;
    a pump;
    a circulation flow path that circulates a working medium between the evaporator, the expander, the condenser, and the pump;
    a cooling medium pipe that is connected to the circulation flow path and allows a portion of the working medium sent out from the pump to flow in the condenser;
    a bypass pipe that communicates between the evaporator and the condenser by bypassing the expander and sends the working medium flowed out of the evaporator to the condenser;
    a first valve that opens and closes the bypass pipe;
    a second valve that switches between a state in which the working medium is allowed to flow in the cooling medium pipe and a state in which the working medium is not allowed to flow therein; and a controller configured to perform a switching control of the second valve; wherein the controller is configured to control the second valve to switch to the state in which the working medium is allowed to flow in the cooling medium pipe when a condition under which both a temperature of the working medium flowing in the condenser becomes higher than or equal to a predetermined temperature and the first valve is opened is satisfied.

2. The exhaust heat recovery system according to claim 1, further comprising a first sensor configured to detect the temperature of the working medium on an inlet side of the condenser, wherein the condition is satisfied when the temperature of the working medium detected by the first sensor is higher than or equal to the predetermined temperature.

3. The exhaust heat recovery system according to claim 1, further comprising:

a first sensor configured to detect the temperature of the working medium on an inlet side of the condenser, wherein the condition is satisfied when the first valve is opened and the temperature of the working medium detected by the first sensor is higher than or equal to the predetermined temperature.

4. The exhaust heat recovery system according to claim 1, wherein the condition is satisfied upon shutting down of the exhaust heat recovery system.

5. The exhaust heat recovery system according to claim 1, further comprising a second sensor configured to detect a pressure of the working medium on an outlet side of the evaporator, wherein the condition is satisfied when the pressure of the working medium on the outlet side of the evaporator detected by the second sensor is higher than or equal to a predetermined pressure.

6. The exhaust heat recovery system according to claim 1, further comprising a third sensor configured to detect a pressure of the working medium on an outlet side of the expander, wherein the condition is satisfied when the pressure of the working medium on the outlet side of the expander detected by the third sensor is higher than or equal to a predetermined pressure.

* * * * *